3,168,448
PROCESS OF PREPARING A LIPOLYTIC ENZYME COMPOSITION
Irving Melcer, Park Forest, and John R. Hansa, Chicago, Ill., assignors to Wilson & Co., Inc., a corporation of Delaware
No Drawing. Filed Jan. 7, 1963, Ser. No. 249,601
8 Claims. (Cl. 195—66)

This invention relates to concentrated enzyme compositions and to a process for isolating the compositions. More particularly, it relates to the production of lipase concentrates of high potency.

The enzyme compositions of this invention comprise highly active concentrates of lipolytic enzyme having the ability to hydrolyze fatty acid esters, such as water-insoluble naturally occurring fats and water-soluble triglycerides. These lipase concentrates are prepared from animal sources of lipolytic enzymes, for example, pancreatic lipase (steapsin) by extracting active principles from the source material with aqueous medium for a period permitting autolysis of the source material and precipitating the active principle from dilute aqueous solution under controlled conditions.

The ability of lipolytic enzymes to hydrolyze fats with the resultant freeing of fatty acids, partial glycerides and glycerin has long been known. Numerous techniques have been advocated for preparing lipase concentrates of enhanced potency, but the methods have not proven completely satisfactory because the results are not consistent and often the lipase is wholly or partially inactivated.

Applicants have discovered that it is possible to produce lipase concentrates having not only a relatively high potency as measured by its ability to hydrolyze water-insoluble fats, but also a relatively high potency as measured by its ability to hydrolyze water-soluble triglycerides, thus making the lipase concentrate effective in a wide variety of mediums.

Lipase concentrates, having the above enumerated characteristics, among which are a high ratio of esterase to lipase activity, are prepared from a source of enzyme such as fresh or fresh frozen pork pancreas, sheep pancreas, and the like, acetone defatted pancreas, and particularly the acetone defatted pork pancreas, an article of commerce known as pancreatin, which is a substance containing enzymes obtained from the pancreas of the hog, and similar materials.

Suitable source material is comminuted and suspended in water to form a free flowing mixture. Comminuted, for example, pork pancreas, is preferably suspended in deionized water to avoid the possible deactivation of enzymes by metal ions at this stage of removal from the source material. The ratio of the volume of water to pounds of source material is not critical and generally will vary with the type of material being treated. In general, between 0.1 and 0.2 gallon of water is necessary to suspend a pound of fresh glands. On the other hand, between 0.6 and 1.2 gallons of water is necessary to suspend acetone defatted glands in a slurry of proper character.

While the slurry volume is of minor importance at this stage of the processing, the temperature at which the solids are extracted and the length of the period for extraction is of major importance in determining the character of the final concentrate, i.e., the level of activity of the lipase concentrate and the ratio of lipase activity to esterase activity.

The temperature maintained during the extraction or steeping step is generally in the range between 0° C. (32° F.) and 15° C. (59° F.). Extraction can be carried out at temperatures above about 15° C. (59° F.), for example at 37° C. (98.6° F.) but the yield of enzyme is about half that obtained when maintaining the above-set forth conditions and the potency of the concentrate is markedly lower than concentrates obtained by low temperature extraction procedures.

To obtain a concentrate of high lipolytic activity, for example, of the order of 6,000 units and a relatively high esterase activity, it is necessary to extract the source material for at least 8 hours, a period found to be necessary to free a major portion of the esterase and believed to be that required for adequate autolysis of the starting tissue.

Preferably, the extraction or leaching operation is continued for a period effecting appreciable autolysis of the tissue, for example, between about 16 and 72 hours although longer periods can be used if desired. Lipolytic concentrates produced in this process show on the average a four-fold increase in lipase activity and an even greater increase in esterase activity. Thus, when processing enzyme-containing material having initially a lipase activity of about 3,000 units/gram and a ratio of lipase to esterase activity in the range between about 10:1 and about 20:1, it is possible to produce concentrates having a lipase activity of the order of 12,000 units/gram and a lipase to esterase activity ratio in the range between about 6:1 and about 15:1 after an autolysis period exceeding about 8 hours.

Following the extraction operation, the tissue solids may be separated from the liquid medium by suitable means, such as a centrifuge, or filter. This separation may be made prior to salting out of impurities from the extract, or subsequent to said salting out operation. Preferably, for simplicity in processing, removal of tissue and salted out impurities is accomplished simultaneously.

In addition to salting out impurities, the addition of salts is necessary to establish a proper ionic strength in the aqueous medium in order to accomplish an effective acetone precipitation of the active principle as hereinafter described.

In the salting out operation, sufficient salt is added to reach a salt concentration of the order of 5 to 10 parts by weight of salt per volume of slurry when the water of the slurry is present in a ratio of about 1 lb. of water per pound of fresh glands or about 7 lbs. of water per pound of defatted glands. Preferably the salt is added to produce a salt concentration of 5 to 6 parts by weight of salt per volume of slurry.

Useful salts for this salting out operation are the ammonium salts, such as ammonium chloride, ammonium acetate, ammonium sulfate, and the like, alkali metal salts, such as sodium chloride, sodium acetate, sodium sulfate, potassium chloride, potassium sulfate, and the like, salts of multivalent cations such as calcium chloride, magnesium chloride, etc.

When the insoluble material has been removed from the suspension, the resultant filtrate is treated to adjust the ionic salt content to less than about 3% and preferably to less than 2% but not below about 1%. The ionic content of the filtrate has a marked effect upon the potency of the concentrate obtained subsequently. Generally this is accomplished by diluting the filtrate with additional cold and preferably deionized water. The filtrate may be diluted with from about 1½ to 4 volumes of added water. Preferably the filtrate is diluted with between 2 and 3 volumes of water. Such dilution results in the precipitation of a minimum amount of non-enzymatic proteinaceous material when precipitating the active principle.

Diluted filtrate is cooled to near freezing and preferably to a temperature in the range between +10° C. and 0° C. prior to the addition of a liquid organic precipitating agent.

Liquid organic precipitating agents useful for the precipitation of the lipolytic concentrates are the water-miscible ketones, such as acetone, methyl ethyl ketone, diisobutyl ketone, and the like, water-miscible aliphatic alcohols, such as ethyl alcohol, propyl alcohol, and the like, water-miscible alkylene oxides, such as dioxan, and the like. The quantity of the precipitating agent will generally vary with its miscibility in aqueous medium. For the purpose of precipitating lipase concentrates, ketones such as acetone are added until the resultant solution contains between about 30% and 50% by volume of acetone, preferably about 35% to 40% of acetone on a volume basis.

The resultant precipitated active principle is a product of improved smell and taste and is a lipolytic concentrate enriched in lipase activity three to sevenfold over the non-fat solids present in starting material, i.e., a concentrate generally having a potency in excess of about 7,500 units and usually in a range between about 6,000 units and 16,000 units per gram. The esterase activity of this concentrate measured in ratio of units of lipase to esterase is between approximately 15:1 and 6:1. The extraction and recovery of lipolytic enzyme is between about 50% and 70% of that in the starting activity.

The precipitated active principles may be dried for storage by appropriate methods known as lyophilization, for example, by the commercial process known as freeze-drying. Alternatively, the active principle may be dried by solvent drying, for example, using acetone, and by equivalent processes.

The invention will be better understood from the following detailed description, which is given by way of illustration, but without any intention that the invention be limited thereto.

PREPARATION OF LIPOLYTIC CONCENTRATE

Example I

One pound of acetone defatted pork pancreas was shredded in a Fitzpatrick mill and the tissue suspended in 0.9 gallon of deionized water maintained at a temperature of approximately 5° C. (41° F.). The suspension was stirred for 5 minutes and then allowed to stand for 2 hours under conditions to maintain the low temperature.

After completion of the extraction operation, 0.5 pound of ammonium sulfate was added to the tissue suspension to provide a salt content of approximately 6 parts by weight of salt per 100 cc. of volume. The ammonium sulfate containing suspension was stirred for 20 minutes and then 1 pound of a filter aid, cellulose fiber sold under the trade name Solka-floc BW–20, was added.

The aqueous phase was separated from the insoluble material on a suction filter. The insoluble material was washed with ½ gallon of deionized water containing ¼ pound of ammonium sulfate in solution, and the resultant wash water was added to the filtrate.

When the source material is not defatted, the use of a filter aid is omitted. Under such circumstances, the mixture is centrifuged at high speed to obtain a three-phase system, a caked fat which is removed, a tissue residue at the bottom, and the aqueous phase containing the active lipolytic enzyme.

The aqueous extract was diluted with deionized water to approximately 4½ gallons of solution. This diluted solution was chilled to about 0° C. (32° F.) and 3 gallons of acetone at −10° C. (14° F.) was added slowly to the mixture while maintaining agitation. After adding all of the acetone, the stirring was continued for 30 minutes. A precipitate of active enzyme was formed in the cold solution and was separated from the liquid by a centrifuge operating at a temperature of −10° C. (14° F.). The separation must be carried out cold to obtain reasonable recoveries of active enzyme and may be carried out at temperatures up to about 10° C. (50° F.). Analysis of the product is shown in Table I.

Example II

The process of treating pork pancreas was carried out substantially as described in Example I except that the extraction period was 3 hours. Analysis of the product is shown in Table I.

Example III

The process of treating pork pancreas was carried out substantially as described in Example I except that the extraction period was 16 hours. Analysis of the product is shown in Table I.

Example IV

The process of treating pork pancreas was carried out substantially as described in Example I except that the extraction period was 64 hours. Analysis of the product is shown in Table I.

Example V

The process of treating pork pancreas was carried out substantially as described in Example I except that the extraction period was 86 hours. Analysis of the product is shown in Table I.

TESTING OF CONCENTRATES

The lipase potency of the lipolytic concentrates was tested in accordance with the general proceedings set forth in an article by Lazo-Wasem, Journal of Pharmaceutical Sciences, vol. 50, pages 999–1000, 1961.

The lipase activity was determined by its ability to split the water-insoluble substrate olive oil acting for 30 minutes at a pH of 7.8 and 37° C. (98.6° F.).

The esterase activity was determined by its ability to split the water-soluble substrate triacetin acting for 60 minutes at 37° C. (98.6° F.) and at a pH of 5.5.

The results of testing the concentrates obtained in Examples I through V are set forth in the following table.

TABLE I

| Examples | Length of Extraction (hrs.) | Potency of Purified Lipase, u./gm. | | Ratio of Lipase to Esterase |
|---|---|---|---|---|
| | | With Olive Oil | With Triacetin | |
| I | 2 | 10,500 | 1,055 | 10:1 |
| II | 3 | 9,100 | 1,020 | 8.9:1 |
| III | 16 | 12,400 | | |
| IV | 64 | 19,600 | 2,630 | 7.5:1 |
| V | 86 | 13,500 | 2,180 | 6.2:1 |

It will be seen from Table I that the lipase concentrate has a maximum activity when the autolysis period approaches 64 hours. It will also be noted that the esterase activity increased very slowly over the first six to eight hours of extraction and then the ratio of units of lipase to esterase decreases rapidly over the next approximately 80 hours.

Example VI

The process of treating a dry, defatted pork pancreas was carried out substantially as described in Example I with a different starting material having a lipase potency of 5,300 units/gram and an esterase activity of 303 units/gram. The autolysis was carried out over a period of 64 hours with samples removed on the time basis indicated, for analysis. Analysis of the various products is shown in Table II.

TABLE II

| Sample | Length of Extraction (hrs.) | Potency of Purified Lipase, u./gm. | | Ratio of Lipase to Esterase |
|---|---|---|---|---|
| | | With Olive Oil | With Triacetin | |
| VIa | (Starting Material) | 5,300 | 303 | 17.5:1 |
| VIb | 6 | 13,200 | 1,009 | 13.1:1 |
| VIc | 11 | 12,500 | 1,089 | 11.5:1 |
| VId | 16 | 15,600 | 1,920 | 8.1:1 |
| VIe | 41 | 22,600 | 2,114 | 10.7:1 |
| VIf | 64 | 17,700 | 1,897 | 9.3:1 |

It will be seen from Table II that a concentrate exhibiting the maximum activity is obtained with this starting material when the autolysis period is of the order of 41 hours. It will be noted, if the data is plotted on the basis of a logarithm of the ratio of lipase to esterase activity versus length of autolysis in hours, that the concentrate has its esterase activity, i.e., ability to split water soluble glycerides, increased slowly over the first approximately 8 hours of the extraction operation and then rapidly over the next 8 to 16 hours.

While a detailed description of the method of preparing the concentrates of this invention, with some possible modifications, has been provided, it should be understood that numerous modifications may be effected without departing from the true scope and spirit of the novel concepts of the invention.

We claim:
1. A method of preparing a concentrate of lipolytic enzyme comprising removing material insoluble in aqueous solution of between 5% and 10% salt content from an aqueous medium obtained by extracting lipase enzyme-containing tissue selected from the group consisting of pork and sheep pancreas with water for a period of at least 8 hours at a temperature in the range between about 0° C. and 37° C., adjusting the concentration of salt ions in the aqueous solution to less than about 3% by weight, adding to the resultant low-ion concentration solution a water-miscible organic liquid in quantities to precipitate a lipolytically active material, and separating the precipitated solids from said low-ion concentration solution.

2. A method of preparing a concentrate of lipolytic enzyme comprising removing material insoluble in aqueous medium of between 5% and 10% salt content from an aqueous solution obtained by extracting lipase enzyme-containing tissue selected from the group consisting of pork and sheep pancreas with water for a period of at least 8 hours and at a temperature in the range between 0° C. and 15° C., adjusting the concentration of salt ions in the aqueous solution to between about 1% and about 2% by weight, adding to the resultant low-ion concentration solution a water-miscible organic liquid in quantities to precipitate a lipolytically active material, separating the precipitated solids from said low-ion concentration solution.

3. A method of preparing a concentrate of lipolytic enzyme comprising extracting lipase enzyme-containing tissue selected from the group consisting of pork and sheep pancreas with water for a period of at least 8 hours at a temperature in the range between about 0° C. and 15° C., removing material insoluble in aqueous solution of between 5% and 10% salt content from said aqueous suspension, adjusting the concentration of salt ions in the aqueous solution to less than about 3% by weight, adding to the resultant low-ion concentration solution a water-miscible organic liquid in quantities to precipitate a lipolytically active material, and separating the precipitated solids from said low-ion concentration solution.

4. A method of preparing a concentrate of lipolytic enzyme comprising extracting lipase enzyme-containing tissue selected from the group consisting of pork and sheep pancreas with water for a period of at least 8 hours at a temperature in the range between about 0° C. and 15° C., removing material insoluble in aqueous solution of between 5% and 10% salt content from said aqueous suspension, adjusting the concentration of salt ions in the aqueous solution to between about 1% and about 2% by weight, adding to the resultant low-ion concentration solution a water-miscible organic liquid in quantities to precipitate a lipolytically active material, separating the precipitated solids from said low-ion concentration solution, and drying the precipitated solids.

5. A method of preparing a concentrate of lipolytic enzyme comprising extracting lipase enzyme-containing tissue selected from the group consisting of pork and sheep pancreas with water for a period of at least 8 hours at a temperature in the range between about 0° C. and 15° C., adding ammonium sulfate to said suspension to remove material insoluble in the solution when it contains between approximately 5% and 10% by weight of the salt, removing precipitated solids from the aqueous filtrate, diluting the aqueous filtrate with water until the concentration of salt ions is reduced to less than 3% by weight, adding acetone to the dilute aqueous solution to produce a solution containing 30% to 50% acetone by volume to precipitate enzyme-containing solids, separating the precipitated solids, and drying the precipitated solids by lyophilization.

6. A method of preparing a concentrate of lipolytic enzyme comprising extracting lipase enzyme-containing tissue selected from the group consisting of pork and sheep pancreas with water for a period of at least 8 hours at a temperature in the range between about 0° C. and 15° C., adding ammonium sulfate to said suspension to remove material insoluble in the suspension when it contains between approximately 5% and 10% by weight of the salt, removing precipitated solids from the aqueous filtrate, diluting the aqueous filtrate with water until the concentration of salt ions is reduced to between about 1% and about 2% by weight, adding acetone to the dilute aqueous solution to produce a solution containing 30% to 50% acetone by volume to precipitate enzyme-containing solids, separating the precipitated solids, and freeze-drying said solids.

7. A method of preparing a concentrate of lipolytic enzyme comprising extracting lipase enzyme-containing tissue selected from the group consisting of pork and sheep pancreas with water for a period of at least 8 hours at a temperature in the range between about 0° C. and 15° C., adding ammonium sulfate to said suspension to remove material insoluble in the suspension when it contains approximately 6% by weight of the ammonium sulfate salt, separating precipitated solids from the aqueous filtrate, diluting the aqueous filtrate with water until the concentration of salt ions is reduced to less than 3% by weight, adding acetone to the dilute aqueous solution to produce a solution containing between about 30% and about 50% of acetone by volume to precipitate enzyme-containing solids, separating the precipitated solids containing enzymes, and freeze-drying said solids.

8. A method of preparing a concentrate of lipolytic enzyme comprising extracting comminuted enzyme bearing tissue selected from the group of pork and sheep pancreas with water for a period in the range between 8 hours and about 86 hours at a temperature in the range between about 0° C. and 37° C., adding water-soluble salt to the aqueous mixture to produce a composition containing approximately 5% and 10% by weight of the salt, separating insoluble pancreas material from the salt-containing solution of enzymatic material, diluting said salt-containing solution to a salt content of less than about 3% by weight, cooling the diluted filtrate to a temperature in the range between 0° C. and +10° C., mixing water-miscible organic liquid with said diluted filtrate in quantities precipitating enzyme-containing solids and separately recovering aqueous solution and precipitated material containing said lipolytic enzyme.

References Cited in the file of this patent

Sarda et al.: Biochemica et Biophysica Acta 23, 264–274 (1957), Elsevier Publishing Co.

Marchis-Mouren et al.: Archives of Biochemistry and Biophysics 83, 309–319 (1959), Academic Press, N.Y.

Desnuelle: Advances in Enzymology 23, 129–161 (1961), Academic Press, N.Y.